United States Patent [19]
Rosenberg et al.

[11] Patent Number: 5,450,536
[45] Date of Patent: Sep. 12, 1995

[54] TECHNIQUE FOR AUTOMATICALLY RESIZING TABLES

[75] Inventors: Andrew S. Rosenberg, Redmond; Christopher R. Jones, Seattle, both of Wash.

[73] Assignee: Microsoft Corporation, Redmond, Wash.

[21] Appl. No.: 1,532

[22] Filed: Jan. 7, 1993

[51] Int. Cl.⁶ ............................................. G06F 17/24
[52] U.S. Cl. ................................. 395/148; 395/155; 395/161
[58] Field of Search ............... 395/118, 133, 139, 144, 395/145, 147, 148, 155, 158; 364/401, 406, 407, 409, 411, 419.07, 419.13, 419.17

[56] References Cited

U.S. PATENT DOCUMENTS

| | | | |
|---|---|---|---|
| 3,787,666 | 1/1974 | Schumann et al. | 235/151 |
| 5,231,579 | 7/1993 | Tsuchiya et al. | 395/148 |
| 5,263,134 | 11/1993 | Paal et al. | 395/158 |

OTHER PUBLICATIONS

Simpson, Allen, *Mastering WordPerfect 5.1 & 5.2 for Windows*, SYBEX Inc., 1993, pp. 176–216, 965.

The Help File From QuatroPro, Borland, Mar. 11, 1991.

"Aldus PageMaker" Table Editor Guide For Use With Microsoft Windows; Jan. 1991 Manual: pp. 1 through 36.

"Using FrameMaker" Manual for Windows; May 1992; Part No. 41–01904–00: pp. 5–11 through 5–29 of Chapter 5.

"Getting Started With FrameMaker" Manual for Windows; May 1992; Part No. 41–01905–00: pp. 89 through 102.

*Primary Examiner*—Mark R. Powell
*Assistant Examiner*—Robert G. Andrews
*Attorney, Agent, or Firm*—Seed and Berry

[57] ABSTRACT

A data processing system is programmed for automatically resizing a table to preserve its original appearance. The table is resized when a cell size changes or when an explicit request from the user is received. The resizing seeks to preserve the relative dimensions of cells in the table as much as possible. The resizing occurs automatically without user intervention. The table may be part of a publication in a desktop publishing system.

17 Claims, 17 Drawing Sheets

|  | Minimum Height | Optimal Height | Current Position |
|---|---|---|---|
| Table | 0 | 4 | 4 |
| Row 1 | 0 | 1 | 1 |
| Row 2 | 0 | 1 | 2 |
| Row 3 | 0 | 1 | 3 |
| Row 4 | 0 | 1 | 4 |

*Figure 2*

|       | Minimum Height | Optimal Height | Current Position |
|-------|----------------|----------------|------------------|
| Table |                | 5              | 5                |
| Row 1 | 0              | 1.25           | 1.25             |
| Row 2 | 0              | 1.25           | 2.5              |
| Row 3 | 0              | 1.25           | 3.75             |
| Row 4 | 0              | 1.25           | 5                |

*Figure 5*

|  | Minimum Height | Optimal Height | Current Position |
|---|---|---|---|
| Table | 2 | 5 | 5.75 |
| Row 1 | 0 | 1.25 | 1.25 |
| Row 2 | 2 | 1.25 | 3.25 |
| Row 3 | 0 | 1.25 | 4.5 |
| Row 4 | 0 | 1.25 | 5.75 |

*Figure 8*

|       | Minimum Height | Optimal Height | Current Position |
|-------|----------------|----------------|------------------|
| Table |  2             | 4              | 5                |
| Row 1 |  0             | 1              | 1                |
| Row 2 |  2             | 1              | 3                |
| Row 3 |  0             | 1              | 4                |
| Row 4 |  0             | 1              | 5                |

*Figure 10*

|  | Minimum Height | Optimal Height | Current Position |
|---|---|---|---|
| Table | 2 | 3.75 | 4.75 |
| Row 1 | 0 | .75 | .75 |
| Row 2 | 2 | 1 | 2.75 |
| Row 3 | 0 | 1 | 3.75 |
| Row 4 | 0 | 1 | 4.75 |

*Figure 12*

|       | Minimum Height | Optimal Height | Current Position |
|-------|----------------|----------------|------------------|
| Table | 2.75           | 3.75           | 4.75             |
| Row 1 | 0              | .75            | .75              |
| Row 2 | 2              | 1              | 2.75             |
| Row 3 | .75            | 1              | 3.75             |
| Row 4 | 0              | 1              | 4.75             |

*Figure 13*

|       | Minimum Height | Optimal Height | Current Position |
|-------|----------------|----------------|------------------|
| Table | 2.75           | 2              | 4.022            |
| Row 1 | 0              | 0.545          | 0.545            |
| Row 2 | 2              | -              | 2.545            |
| Row 3 | .75            | 0.727          | 3.295            |
| Row 4 | 0              | 0.727          | 4.022            |

*Figure 14*

|  | Minimum Height | Optimal Height | Current Position |
|---|---|---|---|
| Table | 2.75 | 1.25 | 4 |
| Row 1 | 0 | .536 | .536 |
| Row 2 | 2 | - | 2.536 |
| Row 3 | .75 | - | 3.286 |
| Row 4 | 0 | .714 | 4 |

*Figure 15*

|  | Minimum Height | Optimal Height | Current Position |
|---|---|---|---|
| Table | 2.75 | 2.679 | 4.0 |
| Row 1 | 0 | 0.536 | 0.536 |
| Row 2 | 2 | 0.714 | 2.536 |
| Row 3 | .75 | 0.714 | 3.286 |
| Row 4 | 0 | 0.714 | 4.0 |

*Figure 16*

TECHNIQUE FOR AUTOMATICALLY RESIZING TABLES

TECHNICAL FIELD

The present invention relates generally to data processing systems and, more particularly, to a method for automatically resizing a table.

BACKGROUND OF THE INVENTION

Desktop publishing systems, such as Publisher, version 1.0, sold by Microsoft Corporation of Redmond, Wash., use "text frames". A text frame is a displayable object having boundaries with fixed dimensions for holding textual information. The textual information is constrained to fit within the boundaries of the text frame. As such, a text frame may be viewed as a clearly defined area that contains text.

Publisher 1.0 allows a user to create a table that is built as a set of adjacent cells, wherein each cell is a separate text frame. The user has no ability to resize the table in aggregate; rather, only individual cells may be resized. Hence, the user also has no ability to resize arrays of cells, such as rows or columns. When a user changes the dimensions of a cell in the table, the dimensions of other cells in the same row or column do not change in response. Instead, the burden of maintaining the relative dimensions of the cells in the table rests entirely with the user.

SUMMARY OF THE INVENTION

It is, therefore, an object of the present invention to provide an improved method for resizing tables in a data processing system.

It is a further object of the present invention to automatically resize cells of a table when a user makes an explicit request to resize the table.

In accordance with a first aspect of the present invention, a method is practiced in a data processing system having a memory and an output device. The method resizes a table on a page to be output on the output device. The table includes a number of arrays of cells. A minimum size of the dimension for each array is determined and stored in memory. The minimum size is a minimum size of the dimension that is necessary to fully display contents of the array. An original optimal size of the dimension for each array is also determined and stored in memory. The optimal size of the dimension of an array refers to the size of the dimension that would be assumed by the array if it were empty. The greater of the minimum size of the dimension and the original optimal size of the dimension for each array is selected as a current size of the dimension for the array.

The method may include the additional steps of changing the minimum size of the dimension for at least one array in response to a change in contents of the array and then repeating the step of selecting the greater of the minimum size of the dimension of the array and the original optimal size of the dimension of the array as the current size of the dimension for each of the arrays, using the changed minimum size of the dimension for the array. Furthermore, the step of changing the minimum size of the dimension for at least one array may comprise adding contents to the array to increase the minimum size of the dimension for the array or, alternatively, deleting contents from the array to decrease the minimum size of the dimension for the array.

The method may also include the additional steps of receiving a user request to change a current size of the dimension for the table to a requested size and changing the current size of the dimension for the table to the requested size. The step of changing the current size of the dimension for the table may involve changing the original optimal size of the dimension for each array to a new optimal size of the dimension for each array such that a first ratio of the new optimal size of the dimension for the array to the requested size of the table substantially equals a second ratio of the original optimal size of the dimension for the array to a sum of the original optimal sizes of the dimension for all of the arrays. Subsequently, for each of the arrays, the greater of the minimum size of the dimension and the new optimal size of the dimension for each array is selected as a current size of the dimension for the array.

The method may, likewise, include the additional steps of receiving a user request to change the current size of the dimension for an array to a requested value and changing the original optimal size of the dimension for the array to the requested value. The requested value is stored in memory as a new optimal size of the dimension for the array. The current size for each of the arrays may then be selected as the greater of the optimal sizes for the arrays and the respective minimum sizes for the arrays. Still further, a minimum size of the dimension for the table and an optimal size of the dimension for the table may be stored in the memory. The minimum size of the dimension of the table is equal to the sum of the minimum sizes of the dimension for the arrays of the table, and the optimal size of the dimension for the table is equal to the sum of the optimal sizes of the dimension for the arrays of the table.

In accordance with another aspect of the present invention, a method is practiced in a data processing system having a memory and an output device. In this method, a table is provided that has a current size of a dimension and that includes at least one array of cells, which may hold contents. A minimum size of the dimension for each of the arrays is stored in the memory, along with a minimum size of the dimension for the table. The minimum size of the dimension for the table being equal to a sum of the minimum sizes of the dimension for the arrays. The minimum size for an array is equal to the smallest size of the dimension that the array may have and fully display its contents. An original optimal size of the dimension is stored in memory for each of the arrays. A current size of the dimension for each of the arrays is determined as the greater of the original optimal size of the dimension for the array and the minimum size of the dimension for the array.

In accordance with this method, a request to change the current size of a dimension, such as height, of the table to a requested size is received from a user of the data processing system. The original optimal sizes of the dimensions for the arrays are changed to updated values in the memory in response to the requested change in the current size of the dimension for the table. The original optimal sizes of the dimension for the arrays are changed such that, for each array, a first ratio of the updated optimal size of the dimension of the array to the requested size of the dimension for the table is substantially equal to a second ratio of the original optimal size of the dimension for the array to sum of the original optimal sizes of the dimension for all of the arrays of the table. For each array, a current size of the dimension for the array is chosen as the greater of the updated optimal size of the dimension for the array and the minimum size of the dimension for the array. The method may include the additional step of outputting the table to the output device, such as a printer.

When the user requests a change in the size of the dimension for the table to a requested size, a determination may be made whether the requested size is less than the minimum size of the dimension for the table. If the requested size is determined to be less than the minimum size of the dimension for the table, the current size of each array of the table is chosen as the minimum size of the dimension for the array, and the above-described steps for calculating updated optimal sizes and choosing a current size are skipped.

In accordance with yet another aspect of the present invention, a method is practiced in a data processing system having a memory and an output device. In this method, a table is provided to be output on a page via the output device. The table includes at least one array of cells, wherein the arrays of cells may hold contents. For each array, a current value of an optimal size of the dimension for the array is stored in memory and a minimum size of the dimension for the array. The minimum size is a smallest size of the dimension that will allow full display of contents of the array. In addition, a current value of an optimal size of the dimension for the table and a minimum size of the dimension for the table are stored in memory.

In this method, a user request to change a current size of the table to a requested size is received. In response to the user request, a temporary value for each array of cells in the table is calculated. The temporary value equals the current value of the optimal size of the dimension for the array times the requested size of the table divided by a sum of the current values of the optimal sizes of the dimension for all of the arrays of the table. A determination is made whether the temporary value for each array is less than the minimum size of the dimension for the array. If the temporary value is less than the minimum size of the dimension, the array is flagged to be ignored subsequently. If none of the arrays are flagged to be ignored, the temporary value is assigned as the current value of the optimal size of the dimension for each array. A greater of the current value of the optimal size of the dimension for the array and the minimum size of the dimension for the array is chosen as a current position of the array in the table for each array. The table is then output on the page via the output device.

If, on the other hand, at least one of the arrays has been flagged, the following steps are performed. A new temporary value is calculated for each array of cells that has not been flagged to be ignored. The new temporary value equals ((current value of the optimal size of the dimension for the array) times ((the requested size of the table) minus (a sum of the minimum sizes of the dimension for the arrays that have been flagged to be ignored))) divided by (a sum of the current values of the optimal sizes of the dimension for the arrays in the table that have not been flagged). A determination is then made for each array in the table that has not been flagged whether the new temporary value is less than the minimum size of the dimension for the array. If the new temporary value of an array that has not been flagged is greater than the minimum size of the dimension for the array, the array is flagged to be ignored subsequently. If at least one array has been flagged in this last step, the above-described steps of this method, beginning with calculating a new temporary value are repeated.

If, in contrast, no array has been flagged, the following steps are performed. New current values of the optimal sizes of the dimension for each array are calculated. The new current values of the optimal size of the dimension are equal to ((the current value of the optimal size of the dimension for the array) times ((the requested size of the table) minus (a sum of the minimum size of the dimension for the arrays that have been flagged))) divided by (the sum of the current values of the optimal size of the dimension for the arrays in the table that have not been flagged). For each array, a greater of the new optimal size of the dimension for the array and the minimum size of the dimension of the array is chosen as a current position of the array. The new optimal size of the dimension for each array is stored in the memory. The table is then output on the page via the output device.

BRIEF DESCRIPTION OF THE DRAWINGS

A preferred embodiment of the present invention will be described below with reference to the drawings. The drawings include the following figures.

FIG. 2 is a table illustrating the initial height characteristics of a first example table.

FIG. 5 is a table showing the height data for the first illustrative table after it has been successfully resized to a height of 5 inches.

FIG. 8 is a table illustrating the height characteristics of the first illustrative table when the minimum height of row 2 is increased to 2 inches.

FIG. 10 is a table illustrating the height characteristics of the illustrative table after the steps shown in FIG. 9 are performed.

FIG. 12 is a table illustrating the height characteristics of a second illustrative table.

FIG. 13 is a table illustrating the height characteristics of the second illustrative table when text requiring a minimum height of 0.75 inch is added to row 3.

FIG. 14 is a table illustrating the height characteristics of the second illustrative table after a first iteration of the approach of FIGS. 9a and 9b has been performed.

FIG. 15 is a table illustrating the height characteristics of the second illustrative table after a second iteration of the approach of FIGS. 9a and 9b has been performed.

FIG. 16 is a table illustrating the final height characteristics of the second illustrative table.

DETAILED DESCRIPTION OF THE INVENTION

A preferred embodiment of the present invention provides a means for automatically resizing a table in a desktop publishing system. Those skilled in the art will appreciate that the present invention is not limited to use within a desktop publishing system environment; rather, it may be used in other environments as well. The preferred embodiment herein acts in response to user activities in the desktop publishing system to resize the table. The preferred embodiment described herein may be encoded as part of the software of the desktop publishing program or encoded as a separate module that works in conjunction with the desktop publishing system.

The preferred embodiment of the present invention described herein provides scaling of the dimensions of arrays of cells (e.g., rows or columns) when the size of the table changes. The preferred embodiment described herein ensures that scaling does not decrease the size of the arrays of cells below a minimum that is required to fully display the contents of the arrays. Without this feature, the preferred embodiment described herein might lose text when scaling the dimensions of rows of the table. As such, the preferred embodiment of the present invention described herein does not adopt a conventional text frame approach; rather, it adopts a modified approach that allows changes to the table to occur without substantially altering the original appearance of the table.

The preferred embodiment of the present invention described herein is concerned with the row heights in a table. Thus, the focus of the discussion below is on row heights. Those skilled in the art will still appreciate that the present invention is not limited to an approach that concerns itself only with row heights. Those skilled in the art will know of alternative embodiments that are concerned with other cell array dimensions, such as column widths.

In the discussion that follows, a table refers to a rectangular grid that is used to present text or data in a columnar format. A table includes at least one cell, and the table is organized into at least one array, such as a row or column. A cell constitutes one element of the table. A "row" is a horizontal array of cells extending between the left side of the table and the right side of the table. A "column" is a vertical array of cells extending between the top of the table and the bottom of the table. A table is composed of rows of cells, columns of cells, contents of the cells and borders that define the cells.

Figure 1:
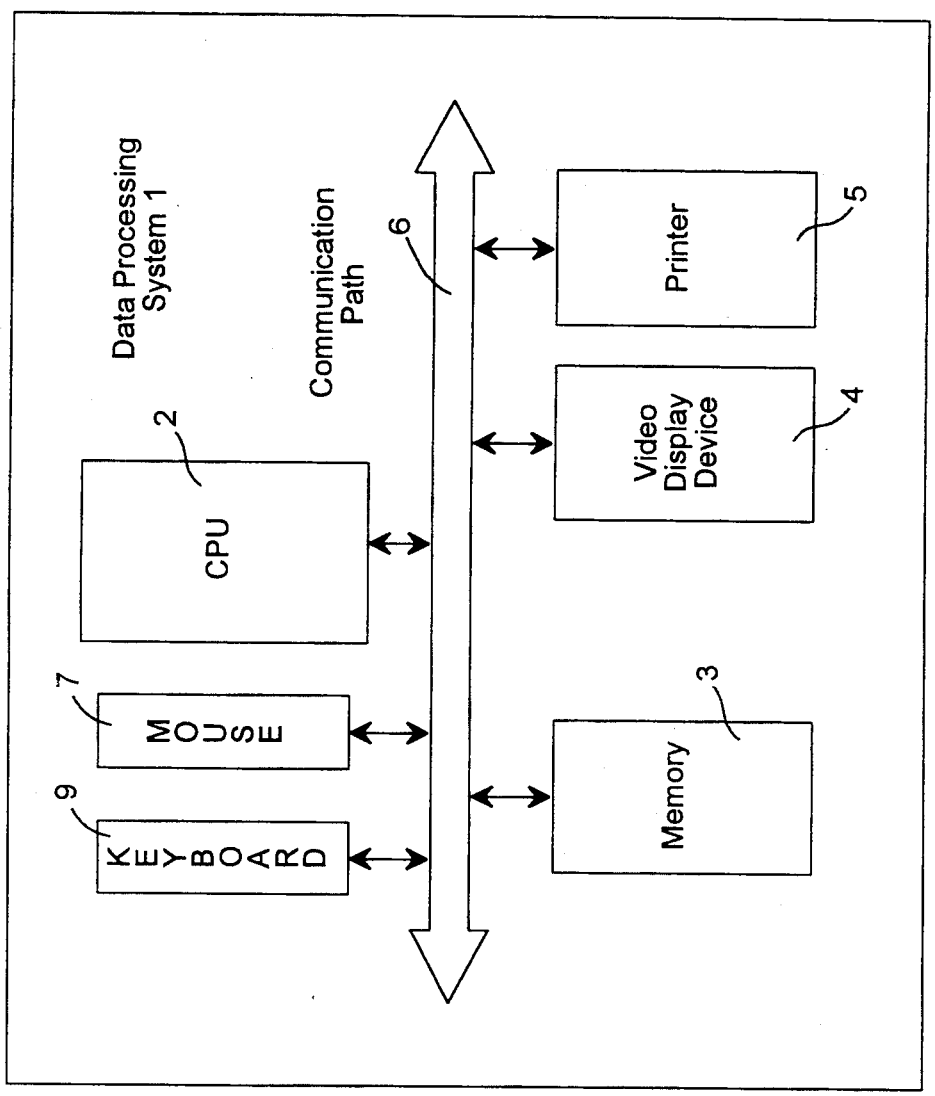
FIG. 1 is a block diagram of an illustrative conventional data processing system in which a preferred embodiment of the present invention is implemented.

The preferred embodiment of the present invention described herein may be implemented on a number of different data processing configurations. FIG. 1 shows an illustrative conventional data processing system 1 on which the preferred embodiment described herein is implemented. The data processing system 1 includes a central processing unit (CPU) 2, a memory 3, a video display device 4, a printer 5, a mouse 7, a keyboard 9 and a communication path 6 (such as a bus or interconnection network). The CPU 2 oversees the activities performed by the data processing system 1 and communicates with the memory 3, display device 4, printer 5, mouse 7 and keyboard 9 via the communication path 6. The memory 3 is used to hold information, such as code and data. The display device 4 and the printer 5 are conventional output devices, whereas the mouse 7 and keyboard 9 are conventional input devices.

The preferred embodiment; of the present invention described herein stores information about a table that facilitates automatic resizing of the table. In some instances, the resizing occurs without the user explicitly requesting resizing of the table. The system 1 maintains table-specific information in memory 2. This information includes the number of rows in the table, the number of columns in the table, the dimensions of the table and the position of the table on a page. In addition, the system stores row-specific data in memory 2. In general, the row-specific data that is stored in memory 2 can be derived from the cell information, but it is useful to store the row-specific data separately. The row-specific data includes the minimum row height and the optimal row height. The minimum row height specifies the smallest height of the row that is permissible to still fully display the contents of the row. The minimum height of a row is equal to the largest minimum height of any cells in the row. The optimal row height specifies the ideal height of the row. The optimal row height is the height that the row will assume when it is empty. The optimal row height is used to preserve the relative ratio of row heights in the table, as will be described in more detail below. The heights of all of the cells in a row may be set to be the same to enhance the appearance of the table.

When a change occurs in a value of the minimum row height or in a value of an optimal row height, the system updates the optimal row heights or minimum row heights and calculates the new current positions for the rows and the table. A change in a minimum row height or an optimal row height also results in a change in the minimum table height or optimal table height, respectively. A minimum row height may change by adding or deleting contents, such as text, from any cell in the row. A optimal row height may change by a user explicitly requesting a change in the row height or by a user explicitly requesting a change in the table height. The change in minimum row height or optimal row height may not result in a corresponding change in the current positions of the rows and current position of the table (i.e., no resizing of the table results). In other instances, however, the change propagates to produce a corresponding change in the current positions of the rows and the current position of the table.

Numerous types of changes in the table cause resizing. One change in the table that causes resizing is when the user of the system explicitly requests that the table be resized. A second type of change in the table that results in resizing is when a minimum row height changes by adding contents to the row so that the minimum row height is greater than the optimal row height. A further type of change in the table that results in resizing is when a minimum row height changes from greater than the optimal row height to less than the optimal row height due to deletion of contents from the row. When the minimum row height is greater than the optimal row height, changes in the minimum row height cause the table height to change (i.e., resizing).

The details of how the current positions change in such instances are described below. Furthermore, a user may request a change in the height of a row. Such changes may cause resizing of the table.

The general approach adopted by the preferred embodiment described herein to assigning current positions is to first calculate the optimal row heights, minimum row heights, optimal table height and minimum table height for the table. Once these updated values are calculated, the system 1 generally seeks to assign optimal row heights as the current positions of the rows. However, the minimum row heights may override the desire to use the optimal row heights as the current positions. Once the optimal row heights and minimum heights have been calculated, the larger of the minimum row height and the optimal row height for each row is selected as the current position of the row. By adopting this approach, the preferred embodiment described herein selects the row heights to be the optimal row heights, unless the size of the contents of a row (i.e., the minimum row height) is larger than the optimal row height and dictates that the row must be assigned the minimum row height rather than the optimal row height.

The preferred embodiment of the present invention described herein will now be described in more detail in conjunction with several examples. The examples provided below concern rows of a table. It should be appreciated that the present invention may act in an analogous fashion on columns of a table. Furthermore, the examples provided below assume that only the row height changes when contents are added or deleted from a row. These examples do not address scenarios that cause changes in column widths.

Suppose that a user of the system has created a table that is 4 inches in height (i.e., the current position of the table is 4 inches), and the table includes four rows that initially have heights of 1 inch each. In other words, the current position of each row is 1 inch greater than the preceding row and the first row has a current position of 1 inch. Initially, in this example, all of the cells in the table are empty. The system stores information for this table, as shown in FIG. 2. The minimum row height of each of the rows is 0 inches, because all of the cells in the table are empty. The optimal row heights are assigned when the table is created. In the present example, each row has an optimal row height of 1 inch. The optimal table height is equal to the sum of the optimal row heights, and the minimum table height is equal to the sum of the minimum row heights. The current position of the table is set equal to the current position of the last row of the table.

Figure 3:
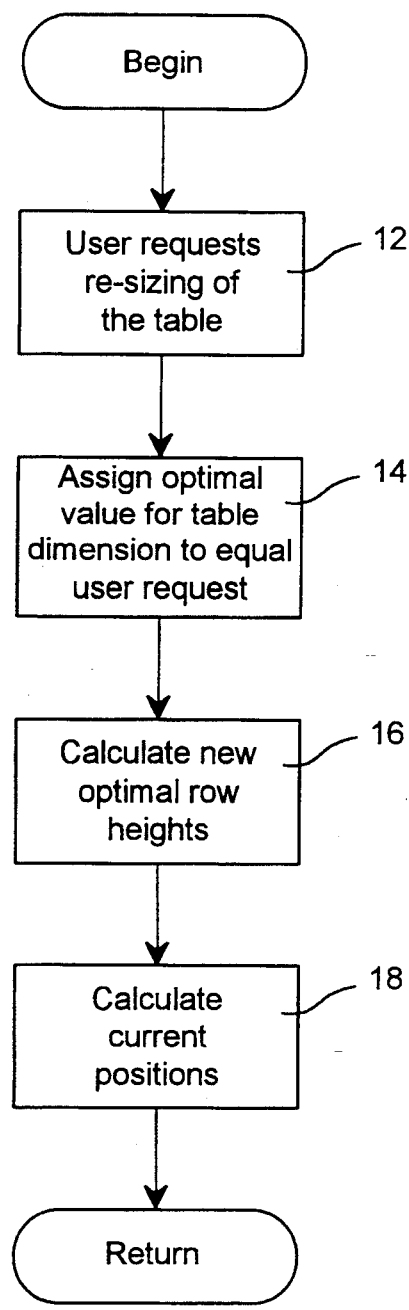
FIG. 3 is a flowchart illustrating the steps performed by the preferred embodiment of the present invention described herein when a user explicitly requests resizing of a table.

FIG. 3 shows a flowchart of the steps performed by the system 1 (FIG. 1) when an explicit request by the user to change the height of the table is received. Suppose that the user wishes to increase the height of the example table of FIG. 2 to 5 inches (see step 12). The optimal height for the table is then initially set equal to the height (i.e., 5 inches) requested by the user (step 14). The system calculates the new optimal row height for each of the rows (step 16) using the new optimal table height. The new optimal row heights are calculated to scale the optimal row heights relative to the new optimal table height. Before discussing the remaining step (i.e., step 18) of FIG. 3, it is helpful to further examine the details of calculating the optimal row heights (step 16).

Figure 4:
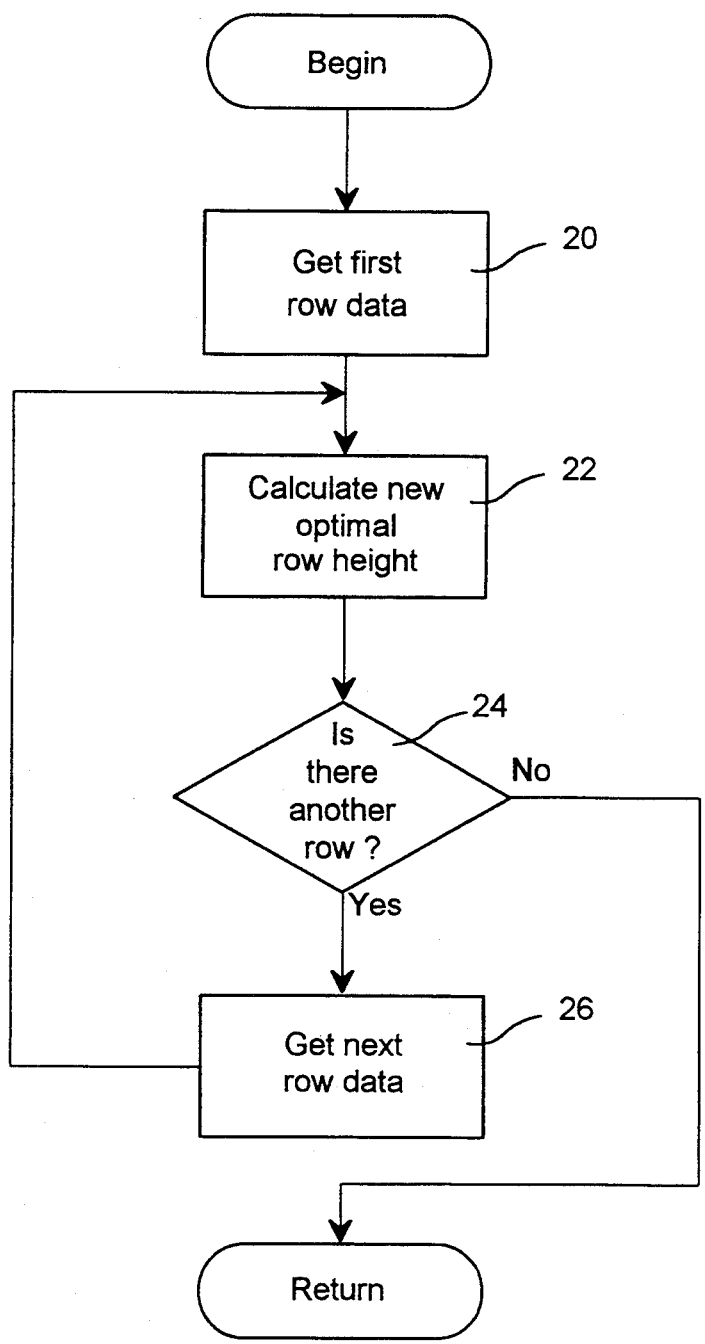
FIG. 4 is a flowchart illustrating the steps performed by the preferred embodiment described herein in calculating new optimal heights for rows of the table.

FIG. 4 shows the steps performed by the system 1 (FIG. 1) in calculating the new optimal row heights. The system first reads the data (i.e., the minimum row height and optimal row height) for the first row (step 20 in FIG. 4). The new optimal row height for the first row is calculated using this data to preserve the relative ratio of optimal row height to optimal table height (step 22). Specifically, the new optimal row height is calculated as equal to:

$$A*B/C$$

where
 A = new optimal table height;
 B = previous optimal row height; and
 C = previous optimal table height.

The above formula ensures that the new optimal row height has the same proportional height that the previous optimal row height had to the previous optimal table height. In the present example, the new optimal table height is 5 inches; the previous optimal row height for row 1 is 1 inch; and the previous optimal table height is 4 inches. By employing this formula in the present example, the new optimal row height for row 1 is equal to: ((5 inches),(1 inch))/(4 inches), which equals 1.25 inches.

The system 1 (FIG. 1) then checks if there is another row in the table (step 24). If there is not another row in the table, calculation of the new optimal row heights is complete. However, if there is another row in a table, the system gets the data for the next row (step 26 in FIG. 4) and repeats the above-described steps 22, 24 and 26 for the next row and all remaining rows in the table until the optimal row heights have been calculated for all of the rows of the table. In the present instance, calculations are performed for the remaining rows 2, 3 and 4 to produce a new optimal row height of 1.25 inches for each row. FIG. 5 shows the minimum row heights, the minimum table height, the optimal table height and the new optimal row heights for this example. FIG. 5 also shows the new current positions for the rows and table, which will be described in more detail below.

Figure 9A:
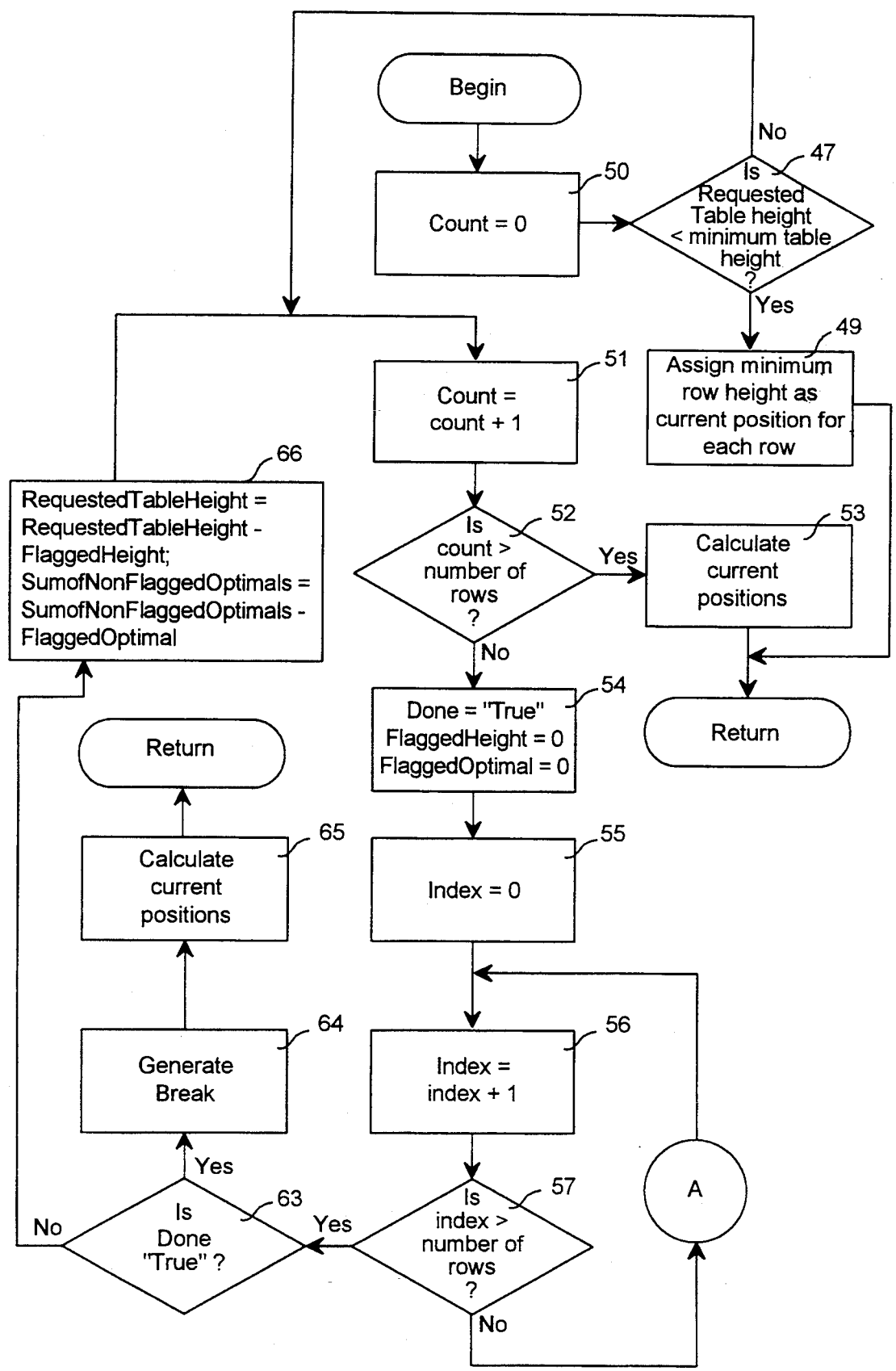
FIGS. 9a and 9b show a flowchart illustrating the steps performed by the preferred embodiment described herein to calculate new optimal row heights when the user requests changing of the height of a table.
Figure 9B:
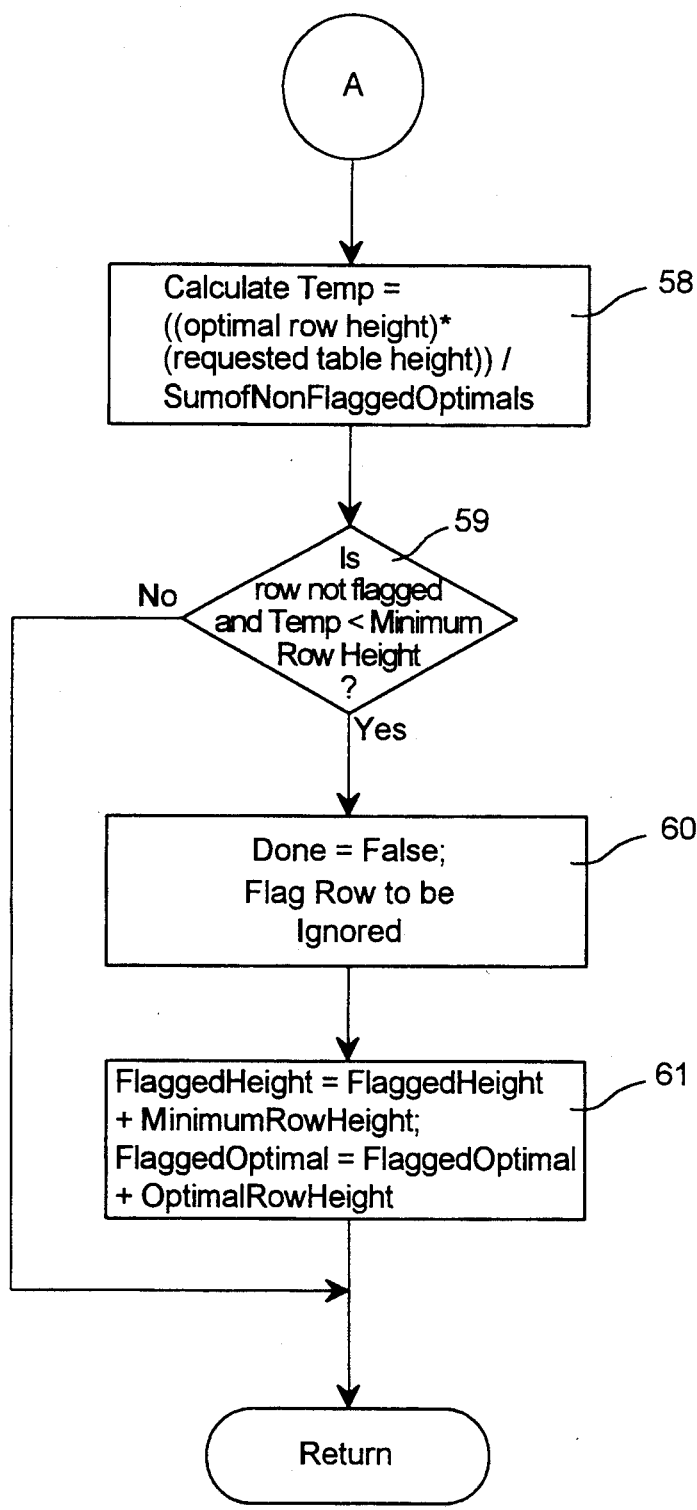

It should be appreciated that the steps shown in FIG. 4 are a subset of the steps shown in FIGS. 9a and 9b. The preferred embodiment described herein always performs the steps shown in FIGS. 9a and 9b for all cases. The steps of FIG. 4 are merely a simplified, single-iteration case of FIGS. 9a and 9b. The steps have been depicted as shown in FIG. 4 to avoid confusion. FIGS. 9a and 9b will be described in more detail below.

Figure 6:
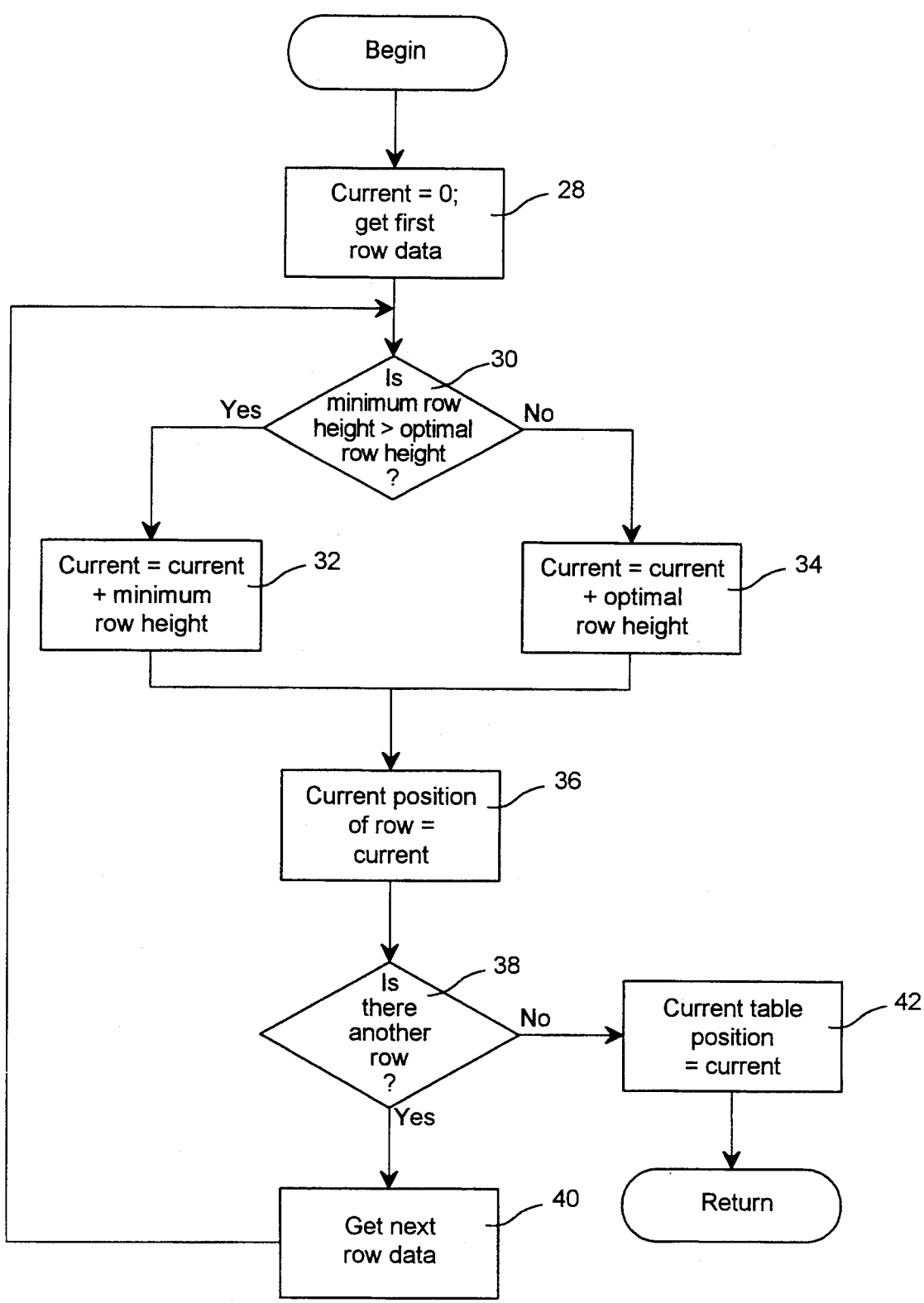
FIG. 6 is a flowchart depicting the steps performed by the present invention in calculating current positions of rows of a table.

Once the new optimal row heights have been calculated (see step 16 in FIG. 3), the current positions of the rows and the table are calculated using the new optimal row heights (step 18). FIG. 6 shows a flowchart of the steps performed in calculating the current positions. A count value (denoted here as "current") is initialized to zero, and the data for the first row in the table (i.e., the minimum row height and optimal row height for the first row) is obtained (step 28). The counter value, "current", is used to properly position each row after its predecessors in the table. The system checks whether the minimum row height is greater than the optimal row height (step 30). If the minimum row height is greater than the optimal row height, the system sets the current position of the row equal to the minimum row height. Hence, "current" is incremented by the minimum height for the first row (step 32). In contrast, if the minimum row height is not greater than the optimal row height, current is incremented by the optimal row height (step 34). In both cases, the current position of the row is set equal to "current" (step 36).

Once the system 1 (FIG. 1) has processed the first row, the system checks if there is another row (step 38 in FIG. 6). If there is another row, the system gets the data for the next row (step 40) and repeats steps 30, 32 or 34, 36 and 38 for the remaining rows. In contrast, if there is not another row (see step 38), the current position of the table is set equal to "current" (step 42). This assignment causes the current table position to be set equal to the current position of the last row in the table.

FIG. 5 illustrates the resulting new current positions for the rows in the present example when the above-described steps of FIG. 6 have been performed. The above-described steps of FIG. 6 are performed to calculate the current positions shown in FIG. 5. In calculating the current position of row 1, the system determines that the minimum row height of row 1 is not greater than the optimal row height of row 1 (see step 30 in FIG. 6). Accordingly, "current" is incremented by the optimal row height of row 1 (step 34). "Current" has a value of 0 inches before being incremented. After "current" is incremented by the optimal row height of row 1 (i.e., 1.25 inches), current has a new value of 1.25 inches. This new value of "current" is subsequently assigned as the current position of row 1 in step 36.

As described above, in step 38, the system 1 (FIG. 1) determines that there is another row and gets the data for the next row in step 40. The minimum row height of row 2 is not greater than the optimal row height of row 2 (see step 30). Hence, step 34 is again executed. In this instance, the new value of "current" is 1.25 inches plus 1.25 inches, or 2.5 inches. The new value of "current" is assigned to the current position of row 2 in step 36. These steps are repeated for rows 3 and 4, to assign row 3 a current position of 3.75 inches and row 4 a current position of 5 inches.

The system 1 (FIG. 1) performs some additional processing after calculating the new current positions for the rows of the example table. The details of this processing will not be described herein because it is not of particular relevance to this case. An additional example will be described below wherein the additional processing is of particular relevance. This additional processing ensures that the calculated current positions produce the requested table height.

Figure 7:
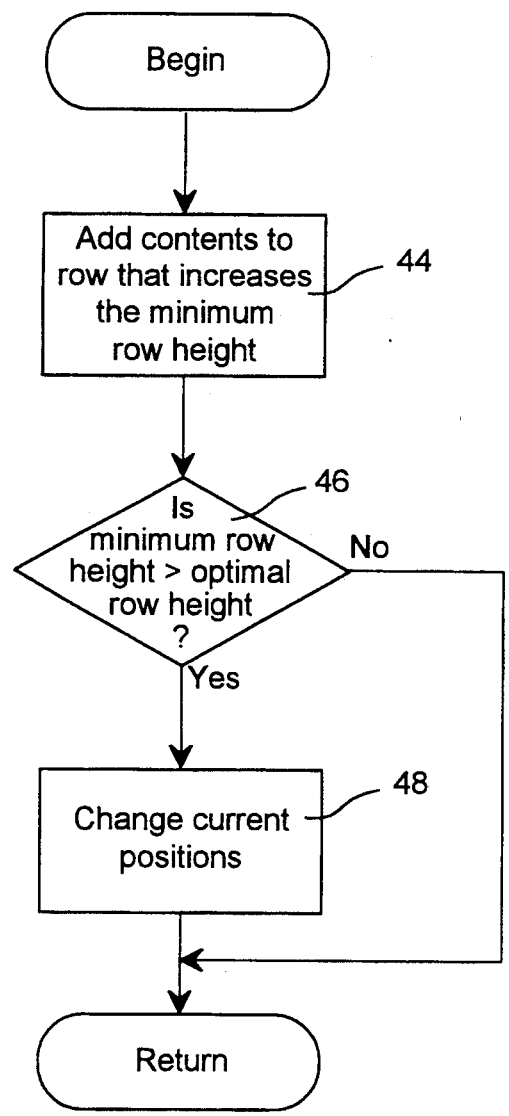
FIG. 7 is a flowchart illustrating the steps performed by the preferred embodiment described herein when contents are added to a cell in a row that increase the minimum height of the row.

The current position of the table (i.e., the height of the table) may also change when the minimum row heights of the respective rows change. FIG. 7 shows a flowchart of the steps performed by the system 1 (FIG. 1) when a minimum row height changes. For example, suppose that a user of the system types a paragraph into row 2 of the table of the above-described example. The addition of this text causes the minimum row height of row 2 to increase to 2 inches (step 44). If the minimum row height is not greater than the optimal row height (step 46), the current positions do not change, because the current position of the row is set as the optimal row height until the minimum row height exceeds the optimal row height. However, if the minimum row height is greater than the optimal row height, the current positions change (step 48). The steps performed in resizing the table in step 48 are those shown in FIG. 6, which have been discussed above. It should be noted that any time an optimal row height or minimum row height changes, the current row positions are recalculated.

In the example case, resizing occurs because row 2 has a minimum row height of 2 inches, which is greater than its optimal row height of 1.25 inches. The resizing proceeds as follows. First, row 1 is examined (step 28 in FIG. 6) to determine if the minimum row height of row 1 is greater than the optimal row height of row 1 (step 30). The minimum row height (0 inches) is not greater than the optimal row height (1.25 inches) in the example case, and thus, "current" is incremented to have a value equal to 0 inches plus 1.25 inches (step 34). The current position of row 1 is then set to be equal to "current" or 1.25 inches (step 36). The system 1 (FIG. 1) next examines row 2 (see steps 38 and 40 in FIG. 6). The minimum row height of row 2 is greater than the optimal row height of row 2 (step 30). Hence, "current" is incremented by the minimum height for the row (step 32). The new value of "current" is 1.25 inches plus 2.0 inches, which equals 3.25 inches. The current position of row 2 is set as 3.25 inches in step 36. Similar calculations are performed to determine the current positions of rows 3 and 4. The resulting current positions for the rows are shown in FIG. 8. It can be seen in FIG. 8 that the adding of text to row 2 resulted in a change of the current position of rows 2, 3 and 4 and increased the current position of the table to 5.75 inches.

Suppose that the user is dissatisfied with the increased size of the table (e.g., 5.75 inches) brought about by the addition of text to row 2 and requests that the table be shrunk to a height of 5 inches. In responding to the user request, the system 1 (FIG. 1) keeps row 2 at a minimum row height of 2 inches and shrinks the other rows a like relative amount to preserve the relative heights of the rows as much as possible. FIGS. 9a and 9b depict the steps performed by the system in shrinking the table to the 5 inches height requested by the user.

The steps shown in FIGS. 9a and 9b provide an iterative approach to calculating optimal row heights for the rows of the table. The iterative nature of this approach will become more apparent from the discussion below. This approach utilizes two loops: an outer loop for cycling through iterations and an inner loop for cycling through the rows of the table. The iterations work generally as follows. Proposed optimal row heights (see "Temp" below) are calculated for each row in the table. If an optimal row height is less than a minimum row height, the row is removed from consideration for the next iteration. In the next iteration, the optimal row heights are calculated for the rows that have not been removed from consideration. If there are still rows that have optimal row heights that are less than the minimum row heights, another iteration is performed. The iterations are repeated until all of the remaining rows have optimal row heights less than their minimum row heights. The calculated optimal row heights are then used to calculate new current positions for the rows. The details of this iterative approach will be given below.

In step 50 of FIG. 9a, the loop index "count" for the outer loop is initialized to have a value of zero (step 50). An initial determination is made whether the requested table height is less than the minimum table height (step 47). If the requested table height is less than the minimum table height, the current positions for the rows are simply the corresponding minimum rows heights (step 49). After assigning the minimum row heights as the current positions, the routine of FIG. 9a returns.

If the requested table height is greater than the minimum table height, "count" is incremented by one (step 51), and a determination is made whether "count" is greater than the number of rows in the table (step 52). This procedure requires, at most, a number of iterations equal to the number of the rows in the table. Thus, this comparison determines whether all of the iterations have been completed or not. If the count is greater than the number of rows in the table, the current positions for the rows are calculated (step 53), as will be described in more detail below. As a practical matter, this path will never be followed, because a break will always occur before this point is reached, as will be described below.

At the beginning of this outer loop, a number of variables are initialized. Specifically, a boolean variable "Done", which specifies whether processing is complete or not, is initialized to have a value of "TRUE." Additional variable "FlaggedHeight" and "FlaggedOptimal" are initialized to have a value of zero. Furthermore, the loop index variable "index" for the inner loop is initialized to have a value of zero (step 55). "Index" is then incremented by one (step 56).

In step 57, the system checks whether "index" is greater than the number of rows in the table. If "index" is greater than the number of rows in the table, it is an indication that an iteration has been completed. The system 1 (FIG. 1) checks whether the boolean variable "Done" has a "TRUE" value (step 63 in FIG. 9a). If "Done" has a "TRUE" value, the iteration was successful and a break is generated (step 64). The current positions of the rows and the table are calculated (step 65), as will be described in more detail below. In contrast, if "Done" does not have a "TRUE" value, the height requested by a user (i e., "RequestedTableHeight") is decremented by the value of the "FlaggedHeight" variable. This decrementing removes the values of minimum row height of flagged rows from "RequestedTableHeight." Further, the sum of the rows in the table that have not been flagged to be ignored is decremented by the value of the "FlaggedOptimal" variable (step 66). Initially, all of the rows in the table are not flagged, and the outer loop begins another iteration.

When an index is greater than the number of rows in the table, the steps shown in FIG. 9b are performed (see "A" in FIG. 9a). First, a value, denoted as "Temp" is calculated (step 58) for the row specified by "index." In particular, the current row data is stored in an array that is indexed by row. "Index" is used as the index into the array. "Temp" is equal to the (optimal row height of the indexed row) times the ("RequestedTableHeight") divided by the (sum of optimal row heights that have not been flagged). In other words, "Temp" is equal to the formula described above for calculating new optimal row height. "Temp" is then compared to the minimum row height of the indexed row. A determination is also made whether the row has been flagged to be ignored in a previous iteration. If "Temp" is less than the minimum row height and the row has not been flagged to be ignored, the boolean variable "Done" is set to have a "FALSE" value, the row is flagged to be ignored by subsequent iterations (step 60), "FlaggedHeight" is incremented by the minimum row height and "FlaggedOptimal" is incremented by the optimal row height (step 61). The inner loop then repeats beginning again with step 56 as shown in FIG. 9a (note path 67 connecting FIG. 9b with FIG. 9a).

In the example case, wherein the user wishes to shrink the current position of the table (see FIG. 8) to 5 inches, "Temp" is calculated for the first row at step 58 (FIG. 9b). In particular, "Temp" is calculated using the above-stated formula to have a value equal to ((1.25 inches) * (5 inches))/(5 inches), which equals 1.25 inches. In step 59, it is determined that "Temp" (i.e., 1.25 inches) is not less than the minimum row height of 0 inches for row 1. Therefore, the requested table height and the sum of the optimal row heights that have not been flagged are not changed in step 66.

The same steps are then repeated for row 2. In row 2, "Temp", likewise, has a value of 1.25 inches, but in step 59 it is determined that "Temp" is less than the minimum row height of 2 inches and row 2 has not been flagged to be ignored. As such, the boolean variable "Done" is set as "FALSE" (see step 60), row 2 is flagged to be ignored in subsequent iterations, "FlaggedHeight" is incremented by 2 inches (see step 61) and "FlaggedOptimal" is incremented by 1.25 inches.

"Temp" is then subsequently calculated for rows 3 and 4. The value of "Temp" for rows 3 and 4 is 1.25 inches. The calculations performed for rows 3 and 4 are identical to the calculation performed for row 1. For both rows 3 and 4, the value of "Temp" is greater than the value of the minimum row heights. As such, "FlaggedHeight" and "FlaggedOptimal" are not changed during processing of these rows.

The first iteration was not successful, so the next iteration is begun by incrementing "count" by one to a value of two (step 51 in FIG. 9a). Execution of the steps shown in FIG. 9a is then performed as described above. In step 58 of FIG. 9b, "Temp" is calculated for the first row during the second iteration. As was discussed above, "Temp" has a value equal to ((optimal row height) * (RequestedTableHeight))/(sum of optimal row heights that have not been flagged). In this iteration, however, the "Requested Table Height" has been decremented by "FlaggedHeight" and "sum of optimal row heights that have not been flagged" has been decremented by "FlaggedOptimal" (see step 66). In the present example, "FlaggedHeight" has a value of 2 inches, and "FlaggedOptimal" has a value of 1.25 inches. Hence, "Temp" has a value equal to ((1.25 inches) * (5 inches−2 inches))/(5 inches−1.25 inches). In other words, "Temp" equals (1.25 inches) * (3 inches)/(3.75 inches), which equals 1 inch.

In step 59 it is determined that "Temp" is not less than the minimum row height. Accordingly, "Temp" is calculated for the remaining rows. Row 2 is ignored because it has been flagged (see step 5a) and rows 3 and 4 are calculated to have "Temp" values equal to 1 inch. The calculated values of "Temp" are used as the optimal heights when the current positions are subsequently calculated. Specifically, since none of the rows had a "Temp" value greater or equal to the minimum row height, the boolean variable "Done" keeps its "TRUE" value and, thus, (see step 62) a break is generated (step 64) to exit the outer loop. The current positions for the rows are then calculated (step 65). The current positions for the rows are calculated by selecting the larger of the minimum row height and the optimal row heights according to the steps set forth in the flowchart of FIG. 6. The optimal row heights for the rows are set equal to the values of "Temp" for the rows in the successful iteration. The resulting optimal table height is the sum of the optimal row heights. FIG. 10 shows the resulting minimum heights, optimal heights and current positions for the rows and table after performing the steps set forth in FIGS. 9a and 9b.

The table may also be automatically resized when text is deleted from a cell of the table. Suppose that the user of the system deletes text from row 2 of the table. This deletion causes the minimum row height of row 2 to changed from 2 inches to 0 inches. The minimum row heights, minimum table height, optimal table height and optimal row heights are then again equal to the values shown in FIG. 2. The system recalculates the current positions (using the steps set forth in FIG. 6) to be equal to the current positions shown in FIG. 2.

Figure 11:
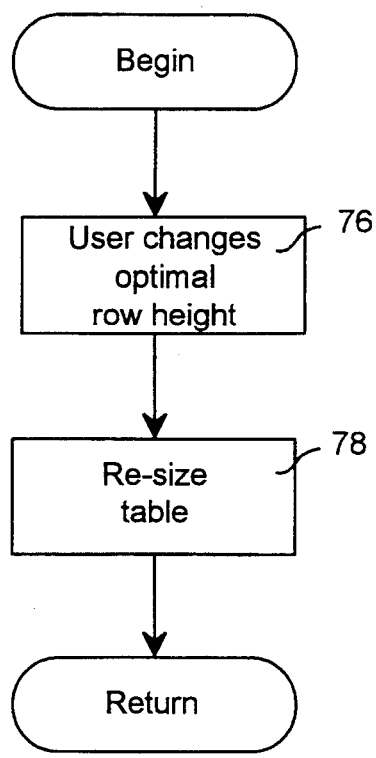
FIG. 11 is a flowchart illustrating the steps performed by the preferred embodiment described herein when the user requests change in the height of a row.

The combined influences on the table configuration of the user adding text to the table, the user specifying a desired row height and the user specifying a desired table height may be illustrated by way of example. Suppose that a table has the minimum row heights, minimum table height, optimal row heights, optimal table height and current position characteristics shown in FIG. 10. Further suppose that the user specifies the dimensions for row 1 to be 0.75 inches. When the user specifies the height, the optimal dimensions of the cell and/or row become those specified by the user. The user specifying row 1 to be 0.75 inches in height changes the optimal row height for row 1 to 0.75 inches (see step 76 in FIG. 11) and changes the optimal table height to 3.75 inches. After this user request, the system 1 (FIG. 1) resizes the table (step 78). The steps performed in resizing the table are those set forth in the flowcharts of FIGS. 9a, 9b and 6. As a result of execution of these steps, the table dimensions are as shown in FIG. 12. In particular, the current position of row 1 is 0.75 inches, as dictated by the optimal row height of row 1. The current position of row 2 is 2.75 inches, as dictated by the minimum row height of row 2, and the current positions of rows 3 and 4 are 3.75 inches and 4.75 inches, respectively, as dictated by their optimal row heights.

Suppose that the user now adds a paragraph into row 3 that is 0.75 inches in height. The addition of this text to row 3 causes the minimum row height of row 3 to increase to 0.75 inches and also causes the minimum height of the table to increase to 2.75 inches. However, since the new minimum row height of row 3 (0.75 inches) is less than the optimal row height of row 3 (1 inch), the added text does not change the current positions of the rows. Accordingly, the minimum heights, optimal heights and current positions for the rows and for the table are as shown in FIG. 13.

Suppose that the user of the system 1 (FIG. 1) now wishes to resize the table to a height of 4 inches. In such a case, the system begins an iterative process by performing the steps shown in the flowchart of FIGS. 9a and 9b. The system calculates "Temp" values using 4 inches as "RequestedTableHeight" for the table. The "Temp" value for row 2, however, is less than the minimum row height for row 2. As such, row 2 is flagged to be ignored, "FlaggedHeight" has a value of 2 inches and "FlaggedOptimal" has a value of 1 inch. An additional iteration is performed using a "RequestedTableHeight" of 2 inches and the sum of the optimal row heights that have not been flagged as 2.75 inches. The resulting "Temp" values shown as optimal row heights for rows 1, 3 and 4 are shown in FIG. 14. Using these optimal row heights would produce current positions as shown.

The system 1 (FIG. 1) then performs yet another iteration of the outer loop shown in FIGS. 9a and 9b, because the minimum row height of row 3 is greater than the optimal row height of row 3. In this iteration, both rows 2 and 3 are ignored. The "RequestedTableHeight" is decremented from 2 inches by 0.75 inches to assume a new value of 1.25 inches. Furthermore, the sum of the optimal row heights that have not been flagged is decremented from 2.75 inches by 0.727 inches to have a new value of 2.023 inches. FIG. 15 depicts the resulting proposed optimal row heights of 0.536 inches and 0.714 inches for rows 1 and 4, respectively. The resulting current positions if these proposed optimal row heights are used as shown in FIG. 15.

In this last iteration, none of the considered rows had "Temp" values less than the corresponding minimum row heights. Hence, "Done" is "TRUE" and a break is generated (see step 64 in FIG. 9a). The current positions are then calculated using "Temp" values from the last iteration as the optimal row heights. The resulting minimum row heights, optimal row heights, minimum table height, optimal table height and current positions are shown in FIG. 16.

From the above discussion, it is apparent that the preferred embodiment of the present invention described herein provides a means for automatically resizing tables so as to preserve the relative sizes of the rows, such that further updating of the table will not alter the basic appearance of the table. The preferred embodiment of the present invention described herein scales dimensions of arrays of cells when the size of the table changes and assures that scaling does not decrease the size of the arrays of cells below a minimum that is required to fully display contents of the arrays. Thus, the preferred embodiment of the present invention described herein strikes a balance between the minimum size requirements dictated by contents of cells of the table and the preservation of relative dimension of arrays in the table.

While the present invention has been described with reference to a preferred embodiment thereof, those skilled in the art will know of various changes in form and scope that may be made without departing from the spirit of the claim invention as defined in the appended claims.

We claim:

1. In a data processing system having a memory and an output device, a method of resizing a table of particular dimensions that includes arrays on a page to be output on the output device, comprising the computer-implemented steps of:

a) for each array in the table, determining and storing in the memory, a minimum size of a selected one of the dimensions for the array wherein the minimum size is a smallest size of the selected dimension that is large enough to fully display all of any contents of the array;

b) for each array, determining with the data processing system and storing in the memory an original optimal size of the selected dimension for the array; and c) for each array in the table, with the data processing system selecting the greater of the minimum size of the selected dimension and the original optimal size of the selected dimension as a current size of the selected dimension for the array.

2. A method as recited in claim 1, further comprising the steps of:

changing the minimum size of the selected dimension for a given array in the table in response to a change in the contents of the given array; and repeating step c) with the changed minimum size of the selected dimension for the given array.

3. A method as recited in claim 2 wherein the step of changing the minimum size of the selected dimension for the given array further comprises the step of adding contents to the given array to increase the minimum size of the selected dimension for the given array.

4. A method as recited in claim 2 wherein the step of changing the minimum size of the selected dimension for the given array comprises the step of deleting contents from the given array to decrease the minimum size of the selected dimension for the given array.

5. A method as recited in claim 2 wherein the step of changing the minimum size of the selected dimension for the given array further comprises the step of changing contents of multiple ones of the arrays in the table to change the minimum size of the selected dimension for the multiple ones of the arrays in the table.

6. A method as recited in claim 1 wherein the selected dimension of the table has a correct size and wherein the method further comprises the steps of:
 receiving a user request to change the current size of the selected dimension for the table to a requested size; and
 changing the current size of the selected dimension for the table to the requested size.

7. A method as recited in claim 6 wherein the step of changing the current size of the selected dimension for the table further comprises the steps of:
 changing the original optimal size of the selected dimension for each array in the table to a new optimal size of the selected dimension for each array in the table such that for each array in the table, a first ratio of the new optimal size of the selected dimension for the array to the requested size of the selected dimension for the table substantially equals a second ratio of the original optimal size of the selected dimension for the array to a sum of original optimal sizes of the selected dimension for all of the arrays in the table; and
 repeating step c) using the new optimal sizes of the selected dimension for the arrays in the table as optimal sizes of the selected dimension for the arrays in the table.

8. A method as recited in claim 1, further comprising the steps of:
 receiving a user request to change a current size of the selected dimension for a particular array to a requested value;
 changing the original optimal size of the selected dimension for the particular array to the requested value; and
 storing the requested value in memory as a new optimal size of the selected dimension for the array.

9. A method as recited in claim 8, further comprising the step of repeating the step of, for each array, selecting the greater of the selected dimension and the original optimal size of the selected dimension as the current size of the selected dimension for the array.

10. A method as recited in claim 1, further comprising the step of storing in the memory a minimum size of the selected dimension for the table that is equal to a sum of the minimum sizes of the selected dimension for the arrays of the table.

11. A method as recited in claim 1, further comprising the step of storing in the memory as an optimal size of the selected dimension for the table that is equal to a sum of the original optimal sizes of the selected dimension for the arrays of the table.

12. In a data processing system having a memory and an output device, a method comprising the steps of:
 a) providing a table having a current size of a selected dimension wherein said table comprises arrays of cells for holding contents;
 b) storing in the memory a minimum size of the selected dimension for each array in the table wherein the minimum size for the selected dimension of the array is equal to the smallest size of the selected dimension that the array may assume to still fully display any contents of the array and storing a minimum size of the selected dimension for the table in the memory as a sum of the minimum sizes of the selected dimensions for the arrays in the table;
 c) storing in the memory an original optimal size of the selected dimension for each array in the table and an original optimal size of the selected dimension for the table;
 d) determining a current size of the selected dimension for each of the arrays in the table as the greater of the original optimal size for the selected dimension of the array and the minimum size for the selected dimension of the array;
 e) receiving a request to change the current size of the selected dimension for the table to a requested size from a user of the data processing system;
 f) changing and storing in the memory the original optimal sizes of the selected dimension for the arrays to updated optimal sizes of the selected dimension for the arrays in response to the requested change in the current size of the selected dimension for the table, such that, for each array, a first ratio of the updated optimal size of the selected dimension for the array to the requested size of the selected dimension for the table is substantially equal to a second ratio of the original optimal size of the selected dimension for the array to the sum of the original optimal sizes of the selected dimension for all of the arrays of the table; and
 g) for each array, choosing as the current size of the selected dimension for the array the greater of the updated optimal size of the dimension for the array and the minimum size for the selected dimension of the array.

13. A method as recited in claim 12 wherein the selected dimension of the array and the table is height.

14. A method as recited in claim 12, further comprising the step of outputting the table to the output device.

15. A method as recited in claim 14 wherein the step of outputting the table further comprises the step of printing the table on a printer.

16. A method as recited in claim 12, further comprising the steps of:
 after receiving the request to change the current size of the selected dimension for the table, determining whether the requested size requested by the user is less than the minimum size of the selected dimension for the table;
 if the requested size is less than the minimum size of the selected dimension for the table:
 (i) for each array, choosing the minimum size of the selected dimension as the current size of the selected dimension for the array; and
 (ii) skipping steps f) and g).

17. In a data processing system having a memory and an output device, a method comprising the steps of:
   a) providing a table having dimensions to be output on a page via the output device, said table comprising at least one array of cells for holding contents;
   b) storing in memory for each array in the table:
      (i) a current value of an optimal size of a selected one of the dimensions for the array;
      (ii) a minimum size of the selected dimension for the array, wherein the minimum size of the selected dimension is a smallest size of the selected dimension that will allow full display of any contents of cells in the array;
   c) storing in memory for the table:
      (i) a current value of an optimal size of the selected dimension for the table;
      (ii) a minimum size of the selected dimension for the table;
   d) receiving a user request to change a current size of the selected dimension of the table to a requested size;
   e) in response to the user request:
      (i) calculating a temporary value for each array of cells in the table, wherein the temporary value equals the current value of the optimal size of the selected dimension for the table times the requested size of the selected dimension of the table divided by a sum of the current values of the optimal sizes of the selected dimension for all of the arrays in the table;
      (ii) determining whether the temporary value for each array is less than the minimum size of the selected dimension for the array;
      (iii) if the temporary value is less than the minimum size of the selected dimension for the array, flagging the array to be ignored subsequently;
   f) if none of the arrays are flagged to be ignored:
      (i) assigning the temporary value as the current value of the optimal size of the selected dimension for each array;
      (ii) for each array, choosing the greater of the current value of the optimal size of the selected dimension for the array and the minimum size of the selected dimension for the array as a current position, of the array in the table;
      (iii) outputting the table on the page via the output device;
   g) if at least one of the arrays has been flagged, repeating the following steps:
      (i) calculating a new temporary value for each array of cells that has not been flagged to be ignored, wherein the new temporary value equals the ((current value of the optimal size of the selected dimension for the array) times ((the requested size of the selected dimension of the table) minus (a sum of the minimum size of the selected dimension for the arrays that have been flagged to be ignored))) divided by (a sum of the current values of the optimal sizes of the dimension for arrays in the table that have not been flagged);
      (ii) determining for each array in the table that has not been flagged whether the new temporary value is less than the minimum size of the selected dimension for the array;
      (iii) if the new temporary value of an array that has not been flagged is greater than the minimum size of the selected dimension for the array, flagging the array to be ignored subsequently;
      (iv) if at least one array was flagged in step g) iii), repeating step g);
      (v) if no array has been flagged in step g) iii):
         calculating new current values of the optimal sizes of the selected dimension for each array in the table as ((the current value of optimal size of the selected dimension for the array) times ((the requested size of the selected dimension of the table) minus (a sum of the minimum size of the selected dimension for the arrays that have been flagged))) divided by (a sum of the current values of the optimal sizes of the selected dimension for arrays in the table that have been flagged);
         for each array, choosing a greater of the new optimal size of the selected dimension for the array and the minimum size of the selected dimension for the array as a current position of the array;
         for each array, storing the new optimal size of selected dimension for the array in the memory; and
         outputting the table on the page via the output device.

UNITED STATES PATENT AND TRADEMARK OFFICE
CERTIFICATE OF CORRECTION

PATENT NO.    :   5,450,536
DATED         :   September 12, 1995
INVENTOR(S)   :   Andrew S. Rosenberg; Christopher R. Jones It is certified that error appears in the above identified patent and that said Letters Patent is hereby corrected as shown below:

In column 15, claim 6, line 20, please delete "correct" and substitute therefor --current--.

Signed and Sealed this

Twenty-third Day of April, 1996

Attest:

BRUCE LEHMAN

*Attesting Officer*      *Commissioner of Patents and Trademarks*